Oct. 15, 1929.　　　　A. TAUB　　　　1,731,831
THERMOSTATIC CONTROL OF INTAKE HEATER
Filed May 29, 1926　　　2 Sheets-Sheet 1

Inventor
Alex Taub
By Blackmore, Spencer & Hitli
Attorneys

Patented Oct. 15, 1929

1,731,831

UNITED STATES PATENT OFFICE

ALEX TAUB, OF DETROIT, MICHIGAN, ASSIGNOR TO GENERAL MOTORS CORPORATION, OF DETROIT, MICHIGAN, A CORPORATION OF DELAWARE

THERMOSTATIC CONTROL OF INTAKE HEATER

Application filed May 29, 1926. Serial No. 112,682.

This invention relates to internal combustion engines, and more particularly to the provision of means to automatically control the temperature of the fuel mixture. The invention has been designed for use with a "constant temperature" or "steam cooled" engine but its use is not necessarily so restricted.

It is well known that when an engine is cold the fuel does not readily vaporize. It is proposed to provide means whereby the exhaust gases may effectively aid in heating the incoming explosive charge during the warming up period.

An object of the invention is to provide for heating the incoming charge automatically. More specifically, it is proposed to make use of the exhaust gases as the medium for providing the heat, and to make use of the cooling medium as the agency to automatically control the influence exercised by the exhaust gases.

The invention is herein described, the accompanying drawing serving to illustrate two specific embodiments.

Figure 1:
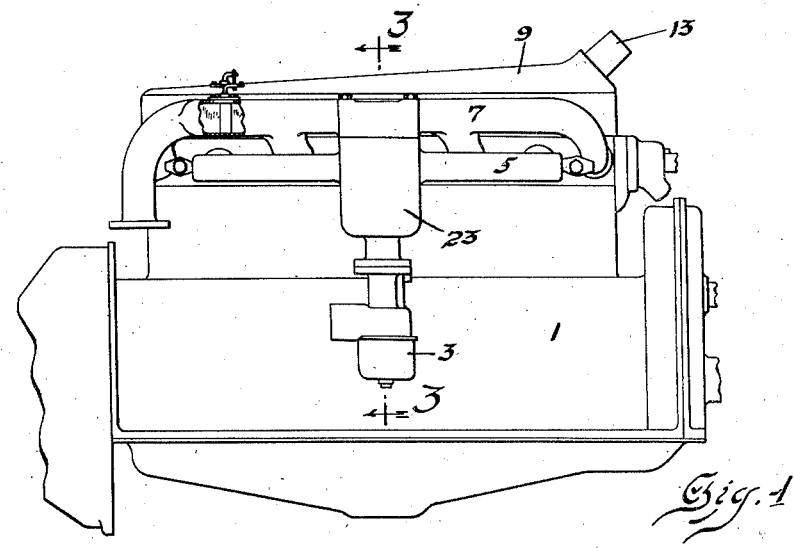
Figure 1 shows in side elevation an engine equipped with my invention.
Figure 2:
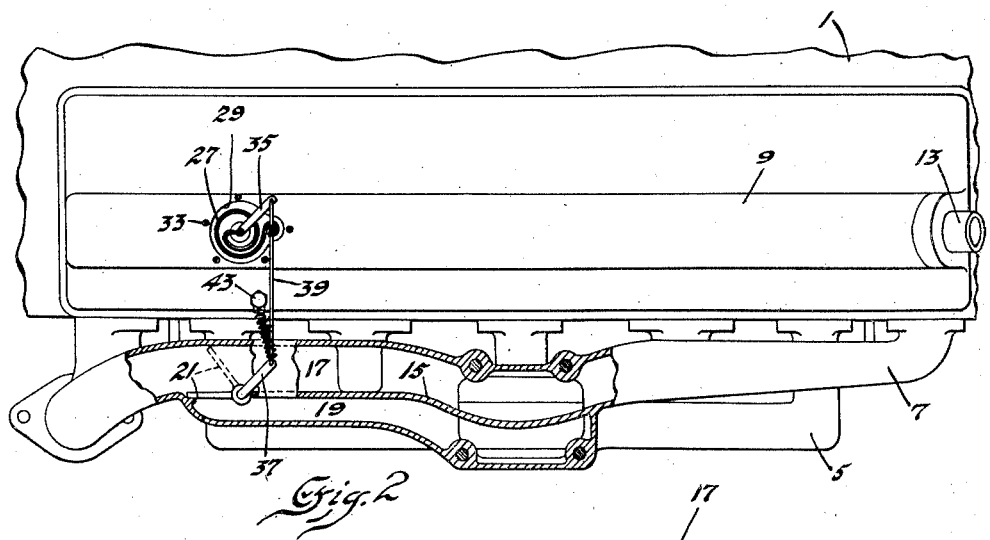
Figure 2 is a top plan view of the same, partly broken away and in section to better illustrate the novel details.
Figure 4:
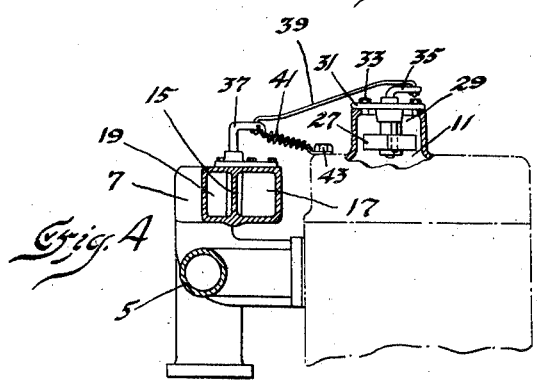
Figure 4 shows the engine in end elevation.
Figure 3:
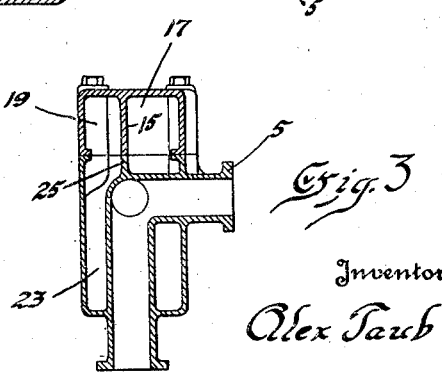
Figure 3 is a section on line 3—3 of Figure 1.

Referring by reference characters to the drawing, and first to Figures 1 to 4, inclusive, numeral 1 represents an internal combustion engine provided with a carburetor 3, an intake manifold 5 and an exhaust manifold 7. The engine has a head 9 within which is a chamber 11 for cooling medium. This chamber 11 will, in the case of a steam cooled engine, receive vapors rising from the cooling water within the cylinder water jacket, and from this chamber 11 the vapors pass through the outlet 13 to the radiator, not shown, to be condensed, as will be understood.

The intake manifold and the exhaust manifold, as shown in these Figures 1 to 4, inclusive, are of the kind more fully described in my application, Ser. No. 112,296, filed May 28, 1926, for intake heater. Briefly described, the exhaust manifold is enlarged for a part of its length and the enlarged portion has an interior partition 15 in alignment with a wall of the main portion of the exhaust manifold. There are thus formed two conduits 17 and 19. At the junction of the two conduits is a valve 21 mounted to close either the passage 17 or the opening at the junction of the two passages 17 and 19. At the portion of the manifold where the enlargement begins it is open at the bottom and fits over an enlarged heater portion 23 of the intake manifold. The latter has a partition 25 registering with partition 15, as clearly shown in Figure 3, thus forming a passageway down from the rear main conduit 17, around the elbow portion of the intake manifold conduit and up to the conduit 19 of the exhaust manifold. Exhaust gases following this channel serve to heat the incoming fuel mixture, as will be readily understood. The valve 21, when in the position shown, forces the exhaust gases around through the manifold heater. When the valve 21 is turned to close the opening between conduits 17 and 19 the exhaust gas traverses the passageway 17 without appreciably heating the incoming fuel mixture.

Within chamber 11 is placed a thermostat 27. This thermostat may be of the well known bimetallic type. It is carried by a plate fitting within an opening 29 in the chamber 11 and has a flange 31 resting upon the top of said chamber to which it is connected by suitable fastening means 33. Externally of the chamber 11 the thermostat has an operating arm 35 and between this arm and an arm 37 of the stem of the valve 21 is a link 39. A spring 41 may be connected to a suitable attaching means 43 on the engine block and to the end of the arm 37. This spring tends to hold the valve 21 in the normal running position, that is, the position where the exhaust gases pass through conduit 17.

The operation will be readily understood. When the engine is cold the thermostat, through the agency of arm 35, link 39 and valve arm 37, holds the valve 21 in the position shown by Figure 2. Under these circumstances the exhaust gases are unable to pass through conduit 17, and are foreced to travel around the tubes of the intake manifold heater from which they escape through conduit 19. After the engine becomes warmed up the changed position of the thermostat arm 35 cooperating with the spring 41 swings the valve 21 to its closed position whereupon the gases escape directly through conduit 17 without appreciably heating the incoming fuel mixture.

Figure 5:
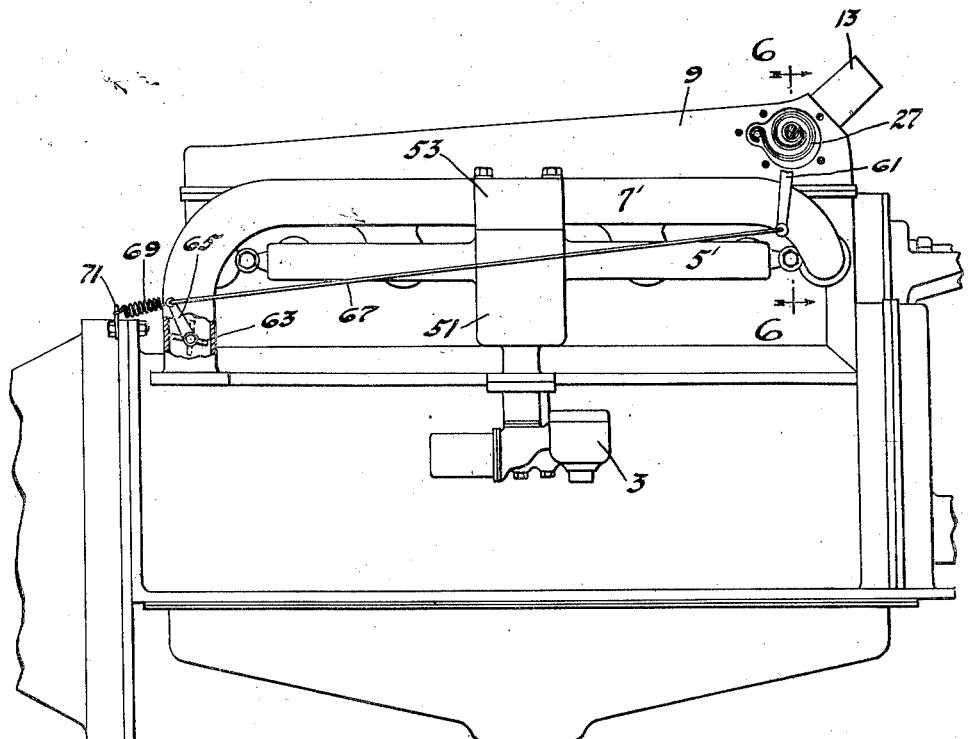
Figure 5 illustrates a modified form of the invention, the figure showing the parts in side elevation.
Figure 6:
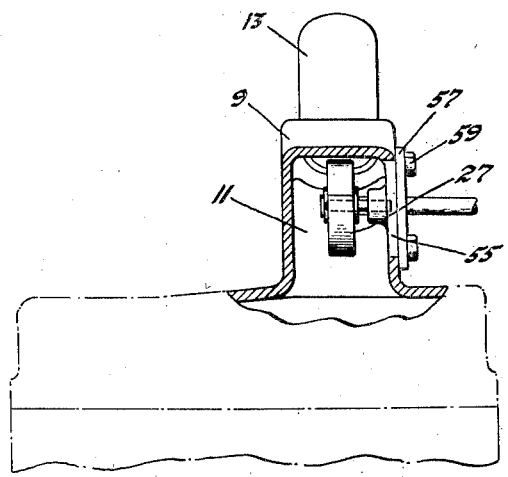
Figure 6 is a section drawn on line 6—6 of Figure 5.

A somewhat simpler form of the invention is shown in Figures 5 and 6. In these figures, 1 represent the engine, 3 the carburetor, 5' the intake manifold and 7' the exhaust manifold. Numeral 9 represents the head having therein the chamber receiving vapors from the cooling medium and 13 the outlet therefrom as before. In this form of invention there are cooperating enlargements 51 on the intake manifold and 53 on the exhaust manifold. An enlargement 51 constitutes a heating chamber and communicates with the enlargement 53 of the exhaust manifold for heating the mixture passing to the engine cylinders.

Within the head 9 is a chamber 11 carrying a thermostat 27 substantially like the thermostat of the form already described. For convenience this thermostat is carried by a disc 55 set into a side wall opening and there is an enlargement 57 which is secured by fastening means 59 to the wall of the head. This thermostat also has an arm 61 projecting downwardly. Near the end of the exhaust manifold is a valve 63 from which extends an external arm 65, a link 67 is used to connect the arm 65 of the valve to the operating arm 61 of the thermostat. For the purpose of holding the valve in its normal position, wherein the exhaust gases pass freely through the manifold a spring 69 is made use of. This spring connects the end of arm 65 with any convenient attaching means as at 71 on the motor.

In this second form of the invention when the engine is cold the action of the thermostat through its operating arm 61 and link 67 is to choke up the exhaust manifold passage by the closure of the valve 63. Under these circumstances the pressure in the exhaust manifold builds up sufficiently to force the hot exhaust gases into the heater 51. This serves to warm up the fuel mixture as it enters the cylinders. After the engine becomes warmed up to running temperature the thermostat opens the valve 63. Thereafter the exhaust gases follow the path of least resistance and do not appreciably heat the incoming mixture.

I claim:

In combination with an internal combustion engine, an exhaust manifold, an intake manifold provided with a heater, said exhaust manifold consisting of a single conduit from one end of said engine to a position adjacent said heater, said exhaust manifold constructed with an integral internal dividing partition from a position adjacent said heater to a position adjacent the other end of the engine whereby that portion of the manifold comprises two conduits, both open at one end to the heater, a valve controlling the junction of said conduits at the other end, a thermostat in said cooling system and a mechanical connection between said thermostat and said valve.

In testimony whereof I affix my signature.
ALEX TAUB.